United States Patent [19]

McGlashen

[11] Patent Number: 4,714,099
[45] Date of Patent: Dec. 22, 1987

[54] VEHICLE AND TIRE THEREFORE

[75] Inventor: James N. McGlashen, Winstanley, England

[73] Assignee: Apsley Metals Limited, United Kingdom

[21] Appl. No.: 846,215

[22] Filed: Mar. 31, 1986

[30] Foreign Application Priority Data

Apr. 9, 1985 [GB] United Kingdom ............... 8509003

[51] Int. Cl.$^4$ ............................................. B60C 15/06
[52] U.S. Cl. .................................... 152/523; 152/542
[58] Field of Search ............... 152/523, 524, 542, 543, 152/DIG. 12; 180/905, 253, 271; 40/587; 301/124 R

[56] References Cited

U.S. PATENT DOCUMENTS

| | | | |
|---|---|---|---|
| 2,920,674 | 1/1960 | Bull | 152/542 |
| 3,225,810 | 12/1965 | Enabnit | 152/523 X |
| 3,578,054 | 5/1971 | Boileau | 152/523 |
| 3,909,906 | 10/1975 | MacMillan | 152/523 X |

FOREIGN PATENT DOCUMENTS

| | | |
|---|---|---|
| 0194070 | 9/1986 | European Pat. Off. |
| 1148116 | 4/1969 | United Kingdom |
| 1341264 | 12/1973 | United Kingdom |
| 1439962 | 6/1976 | United Kingdom |

*Primary Examiner*—Donald E. Czaja
*Assistant Examiner*—Ramon R. Hoch
*Attorney, Agent, or Firm*—Stevens, Davis, Miller & Mosher

[57] ABSTRACT

A pneumatic tire (T) having bead portions reinforced by a respective bead core (18) (19) and a bead reinforcing ply (15) (16). The reinforcing plies have cords (21) therein that are substantially parallel to each other and are arranged so that the cords (21) in one reinforcing ply (15) are substantially parallel to the cords (21) in the other ply (16). A direction mark (23) is located on an external surface of the tire to show the direction of the reinforcing cords (21) in relation to the rotational direction of the tire. When such tires are mounted on the axle unit they may be arranged so that the direction marks are pointed all in the same rotational direction.

1 Claim, 3 Drawing Figures

VEHICLE AND TIRE THEREFORE

This invention relates to vehicles and to tires therefore.

It is known to produce vehicle tires with bead reinforcing plies or strips comprising rubberized cord material, wherein the cords are arranged to be parallel to one another in corresponding parts of the two beads. Thus, if one were able to see into such a tire, on looking at one side the cords would extend diagonally to the bead core in one sense, e.g. top left to bottom right, whereas on the other side of the tire, the cords would extend diagonally in the opposite sense, i.e. top right to bottom left. Such a tire is illustrated in GB No. 1 439 962. This means that during the building of such tires the cords of the bead reinforcing plies have to be positioned in opposing senses as can be seen in FIG. 3.

The reason for this construction is to reduce the possibility of any unwanted bias effects occurring in the tires which would lead to adverse tire performance. However, when more than one tires is mounted on the same axle, or on aligned stub axles on opposite sides of the vehicle further unwanted bias effects can also arise if the bead reinforcing ply cord direction is arranged randomly. It is also an object of the present invention to attempt to put these effects to useful purpose.

In accordance with the present invention there is provided a pneumatic tire having a pair of bead portions each of which is reinforced by a bead core and at least one bead reinforcing ply having bead reinforcing cords that are substantially parallel to each other, the cords of the reinforcing plies in one bead portion being substantially parallel to the cords in the reinforcing plies in the other bead portion, said tire having a direction mark on an external surface related to the direction of the reinforcing cords in the bead reinforcing plies.

Preferably there is also provided a vehicle axle unit with a pair of tire and wheel assemblies of the above description mounted thereon and located on opposite sides of the vehicle, such that the direction marks all point in the same direction of rotation for the respective tires.

Also there is further provided a vehicle with at least two tires and wheel assemblies positioned in use one on each side of the vehicle, each tire of said assemblies having a pair of bead portions each of which is reinforced by a bead core and at least one bead reinforcing ply having reinforcing cords therein which run substantially parallel to each other, the cords of the reinforcing ply in one bead portion extending in the same direction relative to the rotational direction of the tire as the cords of the bead reinforcing ply in the other bead portion, each of said tires also having a ply direction mark on an external surface thereof and which relates to the direction of the cords of the bead reinforcing plies, the tire and wheel assemblies being mounted on the vehicle so that the ply direction marks are in predetermined relationship to each other.

The two assemblies may be mounted on the same axle, or alternatively on two stub axles, one on each side of the vehicle.

It may also be advantageous not only to mount the tires on the vehicle with the ply cords in a predetermined relationship to one another but in a predetermined relationship with respect to the direction of forward travel of the vehicle.

When the vehicle has tires mounted in pairs on an axle on each side of vehicle, then the direction marks of the two tires in each pair can be in predetermined relationship, in that they can both point in the same direction or in opposite directions.

The marks on the tires for use in such vehicles indicate the bead reinforcing ply cord direction to prevent misfitting of such tires on the vehicle.

One embodiment of the invention will now be described by way of example only with reference to the accompanying drawings of which:

Figure 1:
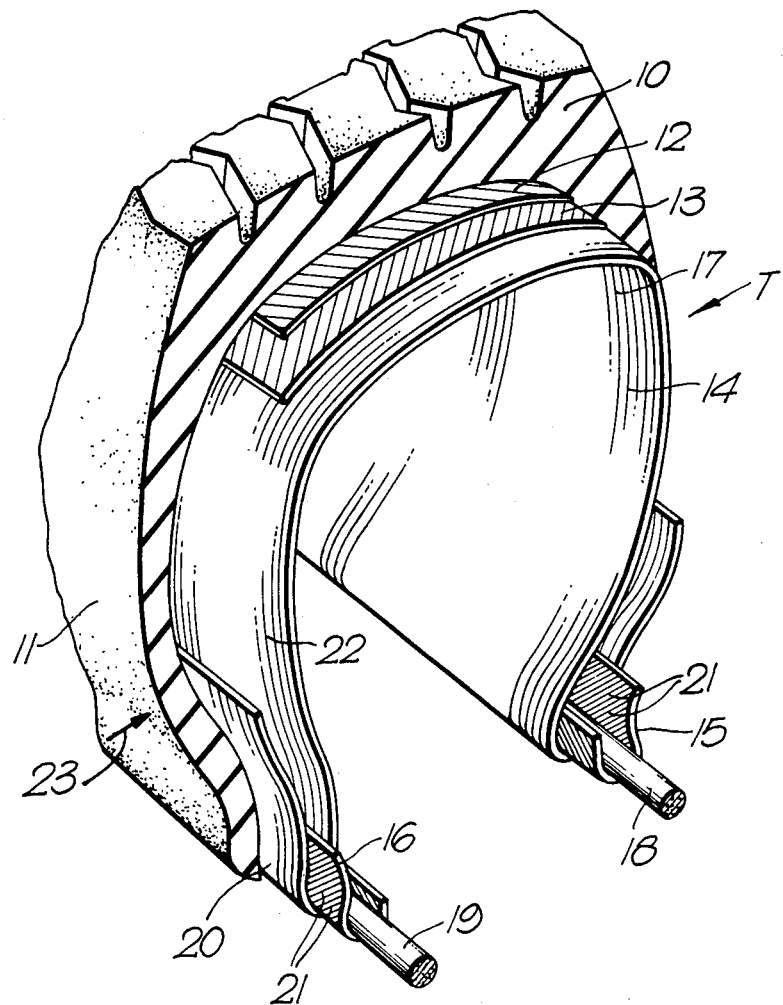
FIG. 1 shows an exploded view part of a radial ply tire according to this invention.

As shown in FIG. 1 a radial ply tire T comprises a ground contacting tread 10 having a pair of sidewalls 11 (only one of which can be seen in FIG. 1) extending radially inwards thereof. The tread 10 and sidewalls 11 are respectively reinforced by two concentric breakers 12 and 13 and a radial carcass ply 14. By radial carcass is meant, a carcass the reinforcing cords of which make an angle of between 70 and 90 degrees to the direction of rotation of the tire.

The inner end portions of the sidewalls 11 terminate in respective portions reinforced by a bead core 18 or 19 which are further reinforced by a bead reinforcing ply 15 or 16.

An inner liner 17 of halobutyl rubber helps prevent air permeating through the body of the tire.

The two bead reinforcing plies 15 and 16 are annular strips and are located one in each bead portion and are wrapped around the respective bead cores 18 and 19 within the radially inner portions of the carcass ply 14 and their respective turnups 20 which are wrapped around the bead cores 18 and 19 from the inside to the outside. The reinforcing cords 21 in each reinforcing ply 15 and 16 are substantially parallel to each other. As can be seen in FIG. 1, bead reinforcing ply cords 21 extend at an angle of approximately 60 degrees with respect to the cords 22 of the radial ply carcass 14, the cords in one reinforcing ply being substantially parallel to the cords in the other reinforcing ply. The plies are of conventional construction each being of suitable cord Material, e.g. steel or textile, encased in elastomeric material.

The tire is marked on the external surface thereof in the lower sidewall region with a ply direction mark 23 to indicate the direction of the cords 21 of the bead reinforcing plies with respect to a relative rotational direction of the tire when mounted on a vehicle and during forward movement of the vehicle. In this example an arrow is illustrated but other direction markings may be used.

Figure 3:
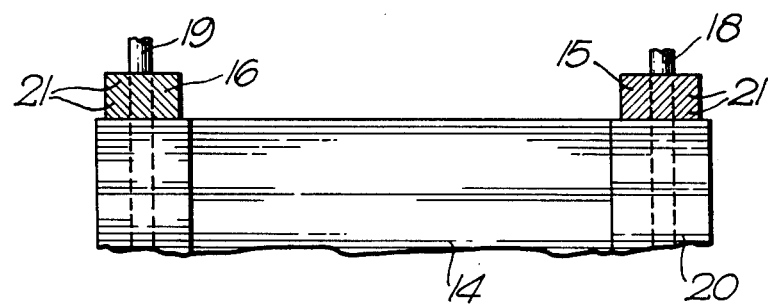
FIG. 3 shows a partial plan view of the tire of FIG. 1 during building.

During the construction of such a tire the reinforcing plies are arranged so that the cords extend in opposite senses as can be seen in FIG. 3 which shows a plan view of part of the tire of FIG. 1 during building on a "flat" building drum.

Figure 2:
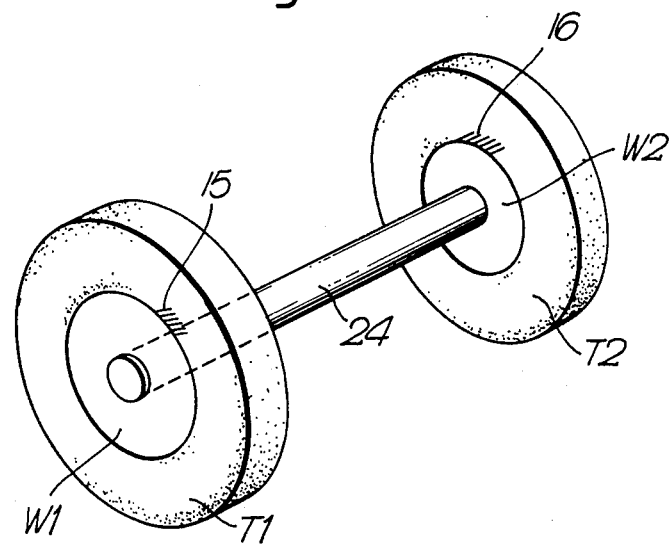
FIG. 2 shows a vehicle axle unit also in accordance with the present invention.

When such two tires T1 and T2 are mounted on a vehicle axle unit 24 it is arranged that the cords of the reinforcing plies 15, 16 extend in the same direction as each other and preferably so that the direction marks on the tires T1 and T2 point in the same direction of rotation relative to the tire. This is illustrated simply in FIG. 2, which shows two wheel (W1, W2) and tire (T1, T2)

assemblies mounted on a single axle, one at each end. The tire and wheel assemblies can alternatively be mounted on a pair of stub axles on opposite sides of the vehicle, and which are preferably aligned with each other. If two tire and wheel assemblies in accordance with the invention are mounted on an axle on one side of the vehicle and two further tire and wheel assemblies in accordance with the invention, are mounted on an aligned axle on the other side of the vehicle, then the cords of the reinforcing plies in corresponding tires are arranged to be parallel to one another, for example, the bead reinforcing ply cords on the innermost two of each pair of tires are parallel to each other and the cords in the outermost two of each pair of tires are arranged to be parallel to one another. Preferably the cords of all four tires extend in the same direction.

If it is desired to obtain a particular bias effect, for example when the tires are used on a racing car which continuously circuits a track in the same direction, then it may be desirable to mount the tires on the vehicle so that the direction marks on the tires on one side of the vehicle point in the opposite direction to the direction marks on the tires on the other side of the vehicle.

Furthermore, it may be possible to further control the bias effect by having the direction of the cords in one bead reinforcing ply extending in the same direction relative to the rotational direction of the tire as the cords in the other bead reinforcing ply in the other bead portion, but not necessarily being substantially parallel to each other.

I claim:

1. A pneumatic tire having a pair of bead portions each of which is reinforced by a bead core and at least one bead reinforcing ply having bead reinforcing cords therein that are substantially parallel with each other and aligned in the same direction with respect to a relative rotational direction of the tire when mounted on a vehicle, the cords of the reinforcing plies in one bead portion being substantially parallel to the cords in the reinforcing plies in the other bead portion, said tire having a direction mark on an external surface related to the direction of the reinforcing cords in the bead reinforcing plies.

* * * * *